United States Patent [19] [11] 4,189,405
Knapton et al. [45] Feb. 19, 1980

[54] INTERMETALLIC CATALYSTS

[75] Inventors: Arthur G. Knapton, Henley on Thames; Ian R. McGill, Thatcham, both of England

[73] Assignee: Johnson, Matthey & Co., Limited, London, England

[21] Appl. No.: 872,747

[22] Filed: Jan. 27, 1978

[30] Foreign Application Priority Data

Feb. 4, 1977 [GB] United Kingdom ............... 4656/77
Feb. 16, 1977 [GB] United Kingdom ............... 6455/77

[51] Int. Cl.² .................. B01J 23/10; B01J 23/42; B01J 23/44; B01J 23/46
[52] U.S. Cl. ..................... 252/462; 252/432; 252/443; 252/447; 252/455 R; 252/457; 252/460; 252/465; 252/466 J; 252/464; 252/466 PT; 252/472; 252/477 R; 423/213.5; 423/403
[58] Field of Search ............ 252/462, 466 PT, 472, 252/477 R, 432, 443, 447, 457, 460, 465, 466 J, 455 R, 464; 423/213.5, 403; 427/252

[56] References Cited

U.S. PATENT DOCUMENTS

| | | | |
|---|---|---|---|
| 3,437,605 | 4/1969 | Keith | 252/463 |
| 3,840,471 | 10/1974 | Acres | 423/213.5 |
| 3,920,583 | 11/1975 | Pugh | 423/213.5 |
| 3,931,051 | 1/1976 | Dubler | 423/403 |
| 3,944,504 | 3/1976 | Ford et al. | 423/213.5 |

Primary Examiner—W. J. Shine
Attorney, Agent, or Firm—Cushman, Darby & Cushman

[57] ABSTRACT

A catalyst comprising a substrate having deposited thereon a first coating containing a refractory metal oxide and having deposited upon the said oxide one or more intermetallic compounds of the general formula $A_xB_y$ where A is selected from the group consisting of Ru, Rh, Pd, Ir and Pt, and B is selected from the group consisting of Al, Sc, Y, the lanthanides, Ti, Zr, Hf, V, Nb, and Ta, and where x and y are integral and may have values of 1 or more.

12 Claims, No Drawings

INTERMETALLIC CATALYSTS

This invention relates to catalysts containing platinum group metals, to new compositions of matter containing platinum group metals and to chemical reactions which may be more effectively performed with the said catalysts.

In many gaseous oxidation reactions in which a precious metal acts as a heterogeneous catalyst, quantities of the catalyst are frequently lost by factors such as oxidation and volatilization. One reaction in which such a loss is particularly important is in the catalytic oxidation of ammonia during the manufacture of nitric acid.

With few exceptions the oxidation of ammonia gas during the manufacture of nitric acid is carried out on a catalyst comprising a multiplicity of or pack of, fine wire gauzes fabricated from a platinum-base alloy. Typically, in a high pressure installation 20-40 gauzes would be employed woven at 80 meshes per linear inch from 0.003 inch diameter 10% rhodium-platinum wire or strip.

Air mixed with ammonia gas in an approximate ratio of 9:1 (by volume) is preheated to about 250° C. and then passed at a relatively high velocity through the gauzes. The ensuing catalysed exothermic reaction results in a gauze operating temperature of 850°-950° C., and the oxidation of the ammonia gas is efficiently catalysed to nitrogen oxides and water. The nitrogen oxides are cooled and absorbed in further water to form nitric acid.

During this oxidation process, some of the precious metal of the wire or strip from which the gauze pack is made is lost by a combination of oxidation and volatilisation, and is carried away in the gas stream. Various methods have been adopted in the past to reduce these losses including catchment gauzes, trays, filters etc., designed to recapture the precious metal from the gas stream after it has been volatilised. These methods have not proved wholly satisfactory, and it is one object of the present invention to reduce the platinum metal losses at source by more rigidity bonding platinum metal atoms to the surface of the catalyst.

Catalysts in accordance with the present invention are not restricted to use in the oxidation of ammonia and may be used in both oxidising and reducing environments where, for example, high temperature, pressure, throughput or some other factor results in a loss of platinum group metal. Examples of other reactions in which catalysts of the invention have applications are (i) the vapour phase oxidation of gases such as $SO_2$, CO HCN and organic molecules such as the hydrocarbons; (ii) the petroleum reforming and hydroforming reactions using a platinum catalyst and a hydrocarbon feedstock; (iii) the reduction of one or more oxides of nitrogen with a gaseous reducing fuel such as methane; and (iv) the methanation reaction.

We have now found that certain intermetallic compounds of Ru, Rh, Pd, Ir and Pt with one or more base metals have high thermodynamic stability and simultaneously maintain high efficiency when used as catalysts in, for example, catalytic oxidation reactions such as the conversion of ammonia to oxides of nitrogen. The intermetallic compounds may be formed with one or more base metals selected from the group consisting of Al, Sc, Y, the lanthanides, Ti, Zr, Hf, V, Nb and Ta. Of these base metals we prefer Sr, Hf, Nb and V.

Some examples of high stability compounds are $AlPt_3$, $TiPt_3$, $ZrPt_3$, $HfPt_3$, $YPd_3$, $LnPd$, $LnPd_3$ and $Ln_5Pd_2$ (where Ln=Sm, Gd, Dy, Ho and Er) $HfIr_3$, $TaIr_3$, $NbIr_3$, $HfIr$, $TaPd$, $TiRu$, $ZrRu$, $NbIr$, $TaRh_3$, $VIr_3$ and $CeRu_2$.

Generally speaking, most of the intermetallic compounds included within the scope of the present invention exhibit extreme hardness or brittleness and it is not practicable to draw and weave them into, for example, a gauze for use in ammonia oxidation.

It is a further object of the present invention to enable intermetallic compounds exhibiting such properties and falling within the scope of the invention to be disposed in a form in which they can be used in severe catalytic reactions, e.g. the oxidation of ammonia.

Accordingly the present invention includes a catalyst comprising a substrate having deposited thereon a first surface coating containing a refractory metal oxide and having deposited upon the said oxide one or more intermetallic compounds of the general formula $A_xB_y$ where A is selected from the group consisting of Ru, Rh, Pd, Ir and Pt, and B is selected from the group consisting of Al, Sc, Y, the lanthanides, Ti, Zr, Hf, V, Nb, and Ta, and where x and y are integral and may have values of 1 or more.

The substrate may be made from either metallic or non-metallic, e.g. ceramic, materials.

Many compounds of the type $A_xB_y$ are miscible with one another and structures in which the surface coatings deposited upon the said refractory metal oxide contains more than one compound of the type $A_xB_y$ are within the scope of this invention.

A number of different techniques may be employed to produce a coating in the form of a thin continuous or discontinuous layer or coating of the intermetallic compound upon the said refractory metal oxide coated metallic or non-metallic substrate.

By way of example, aluminium may be deposited onto the surface of a platinum impregnated oxide by a pack-aluminising process. In this process the platinum impregnated oxide coated onto a substrate is placed in a heat-resistant container in an appropriate mixture of chemicals such that aluminium is transferred via the vapour phase onto the oxide surface. At the aluminising temperature, typically 800°-1000° C., interaction between the platinum and aluminium occurs to give the required intermetallic compound, $AlPt_3$.

Alternatively, chemical vapour deposition from $ZrCl_4$ can be used to form a layer of $Pt_3Zr$, or electrodeposition may be used either from aqueous or fused salt electrolysis to give the requisite compound.

Whichever method is adopted, the purpose is to form a layer of the intermetallic compound which is preferably, but not essentially, firmly adherent to the substrate bearing the refractory metal oxide coating.

In another technique the metals forming the intermetallic compound are prepared as an appropriate solution in water or an organic solvent. The compound is deposited upon the oxide coated metallic substrate by the addition of a reducing agent. The substrate is placed in the solution whilst the precipitation is taking place and becomes coated with a uniform, microcrystalline layer of the intermetallic compound.

The invention also includes an oxide of nitrogen or nitric acid made by a catalyst according to the invention.

In certain circumstances metallic substrates in the form of metallic monoliths are preferred as supports since generally speaking they exhibit lower pressure drops and possess 1½–3 time the surface to volume ratio that can be obtained with a ceramic honeycomb substrate. The normal ceramic substrate has a surface to volume ratio of the order of 600–700 sq. ft. per cubic foot of substrate. Examples are proprietary products Ex20 (Corning which has a surface area of 576 st.ft./ft$^3$ and Grace 400 which is 780 sq.ft/ft$^3$. This is the highest obtained so far and should be compared with 1100 st.ft/ft$^3$ for 0.003" thick Kanthal D sheet and 2000 st.ft./ft$^3$ for 0.002" thick Kanthal D sheet.

A metal substrate is conveniently made from corrugated foil of thickness between 0.0015 and 0.0045 inch (and preferably of thickness 0.002 inch) which is assembled to form a structure having approximately 400 cells per square inch when considered in cross section. A preferred range of cell sizes is 200–800 cells per square inch. Suitable surface to volume ratios are 1200 sq. ft per cubic foot with 400 cells per square inch and 2000 sq. ft. per cubic foot with 800 cells per square inch.

Metals which may be used for fabrication of the monolith support are those capable of withstanding high temperature and rigorous oxidising conditions. Examples of such base metal alloys are nickel and chromium alloys having an aggregate Ni+Cr content greater than 20% by weight and alloys of iron including at least one of the elements chromium (3–40 wt%), aluminium (1–10 wt %), cobalt (trace—5 wt%), nickel (trace—72 weight %) and carbon (trace—0.5 weight %). Additional trace elements which may be present in such alloys to improve strength and oxidation—and heat—resistance are:

|    | %    | W/W  |
|----|------|------|
| Si | 0.2  | 0.9  |
| Mn | 0.2  | 0.7  |
| Zr | 0.01 | 0.20 |
| Cu | 0.01 | 0.15 |
| Nb | 0.01 | 0.3  |
| Ta | 0.8  | 1.2  |
| Ti | 0.8  | 1.2  |
| Ce | 0.01 | 1.0  |
| Ca | 0.01 | 0.5  |

Other examples of base metal alloys capable of withstanding the rigorous conditions required are the iron-aluminium-chromium alloys which also contain yttrium. These contain 0.5–12 wt % Al, 0.1–3.0 wt % Y, 0–20 wt % Cr and balance Fe. These are described in U.S. Pat. No. 3,298,826. Another range of Fe-Cu-Al-Y alloys contain 0.5–4 wt % Al, 0.5–3.0 wt % Y, 20.0–95.0 wt % Cr and balance Fe. These alloys are described in U.S. Pat. No. 3,027,252.

A metallic substrate which has been mechanically deformed to produce an extended surface area possesses when compared with a plain non-deformed substrate, a very much increased exposed surface area for the same volume. Typically, the increased surface area may be achieved by corrugating or folding in a former and winding up a flat foil and a corrugated foil together into a tube having a spiral cross section.

In one embodiment of the present invention, the metallic substrate which is employed as the monolith support for the catalyst is first crimped, corrugated, folded, indented and/or perforated in such a way that a very much more exposed surface area is produced. Such a surface area is normally much greater than that obtained with a ceramic honeycomb or with particulate catalyst supports for the same given volume. An example of a metallic substrate made in accordance with this invention comprises a roll of corrugated sheet of a heat resisting alloy interleaved with a non-corrugated sheet of such alloy. Alternatively, two corrugated sheets may be used with the corrugations in each sheet parallel or transverse relative to each other. A coiled substrate is then provided with a firmly adherent oxide coating which is porous and absorbent and has a high surface area and which acts as the carrier for the second catalytically active layer containing one or more of the catalytic intermetallic compounds as herein defined.

The heat resistant alloys comprising the extended metal substrate are alternatively alloys having a minimum nickel plus chromium content of 20% by weight. Typical alloys which therefore may be used for the extended metal substrate are high nickel and chromium stainless steels and proprietary products such as "INCONEL" (Registered Trade Mark) 600 and "INCONEL" 601.

The metallic honeycomb structure which has thereon a first coating of a refractory metal oxide, is then further impregnated or coated with one or more of the intermetallic compounds specified above. Suitable refractory metal oxides comprising the said first coating are one or more of the oxides of B, Al, Si, Be, Mg, Ca, Sr, Ba, Sc, Y, Ti, Zr, Hf, Th, the lanthanides and the actinides. Preferred refractory metal oxide layers comprise members of the gamma or activated alumina family. This can be prepared, for example, by precipitating a hydrous alumina gel and, thereafter, drying and calcining to expel hydrated water and provide active gamma alumina. A particularly preferred active refractory metal oxide is obtained by drying and calcining at temperatures of 300° to 800° a precursor mixture of hydrous alumina phases predominating in crystalline trihydrate, that is, containing in excess of 50 percent by weight of the total alumina hydrate composition, preferably from 65–95 percent by weight of one or more of the trihydrate forms of gibbsite, bayerite and norstrandite by X-ray diffraction. We prefer to use British Aluminium Co. grade MH170 alumina hydrate and convert it to activated alumina by drying and firing as described above. We prefer to provide the metallic substrate with a first firmly adherent oxide layer in an essentially two stage process. In the first stage the metallic substrate is thermally oxidised to provide a thin first oxide layer which acts as a key. We prefer to carry out thermal oxidation by maintaining the formed metallic substrate at from 1000°–1200° C. in air or moist cracked ammonia vapour, for 1 hour. The higher temperature is required with very oxidation resistant alloys such as the Kanthal range and the moist hydrogen atmosphere is preferred with alloys having a high Ni content.

The adherent oxygen containing or oxide film for application to both metallic and non-metallic substrates may be produced by any one of several known methods including chemical techniques. The film must be of sufficient thickness to provide adequate absorptive capacity for retaining the catalytically active alloy comprising one or more of the platinum group metals. The film is preferably from 0.0004 to 0.001 inches thick.

Where aluminium is present in the alloy forming the extended metal substrate the oxide film may be produced by treating the aluminium containing surface with a solution of an alkaline carbonate usually a sodium carbonate-chromate solution. The film may be produced by the anodic oxidation of the metal surface whereby the metal is made the anode in an electrolytic solution. In anodising aluminium containing surfaces, a 15% sulphuric acid solution is commonly employed as the electrolyte but other acid electrolytes such as chromic acid, oxalic acid, phosphoric acid and, sometimes, boric acid may be used. The oxide film to which this invention relates is deliberately positioned and does not include the relatively thin natural oxide films which sometimes occur on metal surfaces which have been exposed to the atmosphere.

One method of forming an alumina layer on these alloys which do not contain sufficient aluminium to form their own alumina layer upon oxidation is the use of Calorising (Registered Trade Mark). This involves the vapour deposition of an aluminium coating followed by anodising or heating in an oxygen-containing gas. Alternative coatings such as chromate, phosphate, silica or silicate or zirconia may all be deposited by known methods.

The ceramic supports may be either of the particulate e.g. pellet type or they may be monolithic. Monolithic ceramic supports are preferably of the "honeycomb" type having a regular array of gas flow channels. Suitable materials which may be used to constitute the ceramic support are zircon-mullite, mullite, alpha alumina, sillimanite, magnesium silicates, kaolin clays, zircon, petalite, spodumene, cordierite and most aluminosilicates.

Proprietary products which may be used are described in Talsma U.S. Pat. No. 3,397,154, Stiles U.S. Pat. No. 3,498,927 and Corning British Pat. No. 882,484. Examples are "Torvex" (Registered Trade Mark) which is a mullite honeycomb having eight corrugations per inch and bearing an alumina washcoat; "Thermacomb" (Registered Trade Mark), a cordierite honeycomb supplied by the American Lava Corporation and EX 20 a cordierite honeycomb supplied by Corning Glass.

Suitable supports of the pelleted type porous silica for example that sold under the trade mark "Silocel" granular charcoal, alpha or gamma alumina granules or pellets, naturally occuring or synthetic alumino silicates, magnesia, diatomaceous earth, bauxite, titania, zirconia, limestone, magnesium silicate, silicon carbide, activated and inactivated carbons. The above materials may be in the form of regularly or irregularly shaped particles such as capillary tubes, extrudates, rods, balls, broken pieces or tiles, etc.

Preferably, the ceramic particulate support or honeycomb structure has deposited thereon a first coating of a refractory metal oxide which is further impregnated or coated with one or more of the intermetallic compounds mentioned above. Suitable refractory metal oxides comprising the said first coating are one or more of the oxides of B, Al, Si, Be, Mg, Ca, Sr, Ba, Sc, Y, Ti, Zr, Hf, Th, the lanthanides and the actinides. Preferred refractory metal oxide layers comprise members of the gamma or activated alumina family. This can be prepared, for example, by precipitating a hydrous alumina gel and, thereafter, drying and calcining to expel hydrated water and provide active gamma alumina. A particularly preferred active refractory metal oxide is obtained by drying and calcining at temperatures of 400° to 800° C. a precursor mixture of hydrous alumina phases predominating in crystalline trihydrate, that is, containing in excess of 50 percent by weight of the total alumina hydrate composition, preferably from 65 to 95 percent by weight of one or more of the trihydrate forms of gibbsite, bayerite and norstrandite by X-ray diffraction. We prefer to use British Aluminium Co grade MH 170 alumina hydrate and convert it to activated alumina by drying and firing as described above.

There are many different techniques for the preparation of a high surface area catalytically active refractory metal oxide wash coat containing one or more of the refractory metal oxides which convert beneficial properties as regards ageing and inertness to the deposited intermetallic compounds at high temperature under oxidising and reducing conditions.

A preferred adherent oxide coating deposited upon the extended metallic or the non-metallic substrate is alumina in which the surface area of the alumina falls within the range 50–500 square meters per gram of alumina.

One method for the deposition of hydrous alumina is proposed in U.S. Pat. No. 2,406,420. Any convenient aluminium compound such as alkali metal aluminates and aluminium salts may be used as the starting material. Either acidic or basic precipitants are used, depending upon the character of the starting material. Suitable acidic precipitants are ammonium chloride, ammonium sulphate, ammonium nitrate, hydrochloric acid, nitric acid, etc. Suitable basic precipitants are ammonium hydroxide, sodium hydroxide, hexa-methylene tetramine, etc.

A further method is to precipitate the hydrous alumina from an alkali metal aluminate solution containing excess aluminum and alkali metal hydroxide directly onto the metal or ceramic substrates forming part of the present invention. If the aluminate solution is maintained at a temperature of 60°–85° C. a film or coating of alpha alumina trihydrate (Gibbsite) is deposited. Subsequent heating at 250°–180° C. converts the tri-hydrate to the monohydrate and further heating at 540° C. converts the monohydrate to gamma alumina without loss of the very high surface area coating which is produced by this method. The high surface area results from the formation of hexagonal crystal aggregates of approximate size $8 \times 8 \times 20$ microns. Micropores of size of 40 Å diameter are present in the hexagonal crystal aggregates but appear to play no part in the catalytic activity of the structure.

We prefer a washcoat loading which is within the range of 5–30% by weight of the metallic monolith substrate. A suitable loading of $Al_2O_3$ on Kanthal D (Registered Trade Mark) having 400 cells per square inch is 10% by weight. The surface area of the alumina is 50–500 square meters per gram of alumina. The aluminate method of deposition of alumina, described above, gives a surface area of from 120–160 square meters per gram of alumina.

Yet a further method for the deposition of an adherent alumina washcoat on a metallic or ceramic substrate is to prepare a slurry of a preactivated Gibbsite (alumina trihydrate) and an alumina monohydrate having a solid-liquid ratio of between 25 and 50% and a pH less than 7 and using this to impregnate the shaped substrate by complete immersion. The exact strength of the slurry used (which may be determined by trial and error) should be sufficient to produce an alumina washcoat of the required thickness. The substrate is then allowed to dry in warm air and finally fired for 2 hours at 450° C. to form chi and gamma alumina in adherent coating up to 0.002 in. thick on the metallic substrate. Crystal aggregates of diameter 3–7 microns are produced having micropores of approximately the same size, i.e. 40 Å in diameter.

A still further method of depositing an adherent alumina washcoat on the substrate is to use a slurry of alpha alumina monohydrate. After firing at 450° C. gamma alumina is formed having a surface area between 180 and 300 square meters per gram. Gamma alumina is added to alpha alumina monohydrate at the slurrying stage before firing in order to form a thixotropic mixture. Crystallite or crystal aggregates of 20–100 Å diameter are formed. Micropore diameters remain the same at 40 Å.

Suitable proprietary alumina tryhydrates (Gibbsite) are "FRF 80" supplied by British Aluminium Chemicals Ltd., and "C 333" supplied by Conoco. Suitable alumina monohydrates (Boehmite) are "Sol-Gel Alumina" supplied by the United Kingdom Atomic Energy Authority. "Dispal M" supplied by Conoco and "Condea F" supplied by the Condea Group. Gibbsite is added to "Sol-Gel Alumina"(which is microchrystalline Boehmite) at the slurrying state in order to form a thixotropic mixture.

Optionally, one or more of the oxides titania, zirconia, hafnia and thoria may be present in the alumina for the purpose of providing additional stabilisation of the intermediate oxide (washcoat) layer. Other rare earth oxides, alkaline earth oxides and alkali metal oxides may also be used.

Many of the aluminium-containing metallic substrates according to the present invention have the property of oxidising "inwards". That is to say we believe that a factor contributory to the success of the present invention is the fact that the extended metal substrate itself, which forms part of the catalytic structure of the present invention has a tendency to oxidise under very strongly oxidising conditions in such a way that the first layer of adherent oxide film does not tend to grow over or cover the outermost layer of intermetallic compound.

As mentioned previously, the coating of the intermetallic compound may be continuous or discontinuous but, if desired, the said coating may be in the form of a fine micro crystalline dispersion.

What we claim is:

1. A catalyst comprising a substrate having deposited thereon a first coating containing a refractory metal oxide and having deposited upon the said oxide one or more intermetallic compounds of the general formula $A_xB_y$ where A is selected from the group consisting of Ru, Rh, Pd, Ir and Pt, and B is selected from the group consisting of Al, Sc, Y, the lanthanides, Ti, Zr, Hf, V, Nb, and Ta, and where x and y are integral and may have values of 1 or more.

2. A catalyst according to claim 1 wherein the substrate is metallic.

3. A catalyst according to claim 2 wherein the metallic substrate is made from an alloy containing nickel and chromium having an aggregate nickel and chromium content greater than 20 wt.%.

4. A catalyst according to claim 2 wherein the metallic substrate is made from an iron alloy including at least one of the following elements:

| Chromium | 3-40 wt %; |
| aluminium | 1-10 wt %; |
| cobalt | trace to 5 wt %; |
| nickel | trace - 72 wt %, and |
| carbon | trace - 0.5 wt %. |

5. A catalyst according to claim 4 wherein the metallic substrate includes at least one of the following elements present from a trace to the following weight percentage:

| Silicon | 0.2 |
| Manganese | 0.2 |
| zirconium | 0.01 |
| copper | 0.01 |
| niobium | 0.1 |
| tantalum | 0.8 |
| titanium | 0.8 |
| cerium | 0.01 and |
| calcium | 0.01. |

6. A catalyst according to claim 2 wherein the metallic substrate comprises 0.5 to 12 wt % aluminium, 0.1 to 3.0 wt % yttrium, 0 to 20 wt % chromium and balance iron.

7. A catalyst according to claim 2 wherein the metallic substrate comprises 0.5 to 4 wt % aluminium, 0.5 to 3.0 wt % yttrium, 20 to 95 wt % chromium and balance iron.

8. A catalyst according to claim 1 wherein the substrate is made from a ceramic material.

9. A catalyst according to claim 8 wherein the substrate is monolithic and is made from a material selected from the groups consisting of zircon-mullite, mullite, alpha-alumina, silli-manite, magnesium silicates, zircon petalite, spodumene, cordierite and alumino-silicates.

10. A catalyst according to claim 8 wherein the substrate is in the form of pellets and is made from a material selected from the group consisting of granular charcoal, alpha or gamma alumina granules or pellets, naturally occurring or synthetic alumino-silicates, magnesia, diatomaceous earth, bauxite, titania, zirconia, limestone, magnesium silicate, silicon carbide, activated and inactivated carbons.

11. A catalyst according to claim 1 wherein the first coating comprises at least one oxide of a metal selected from the group of metals consisting of B, Al, Si, Be, Mg, Ca, Sr, Ba, Sc, Y, Ti, Zr, Hf, the lanthanides and the actinides.

12. A catalyst according to claim 1 wherein the intermetallic compound $A_xB_y$ is selected from the group consisting of Ti Pt$_3$, ZrPt$_3$, HfPt$_3$, YPd$_3$, LnPd, LnPd$_3$ and Ln$_5$Pd$_2$ (where Ln=Sm, Gd, Dy, Ho, and Er), HfIr$_3$, TaIr$_3$, NbI$_3$ HfIr, TaPd TiRu, ZrRu, NbIr, TaRh$_3$, VIr$_3$ and CeRu$_2$.

* * * * *